US 008161113B2

(12) United States Patent
Gaurav et al.

(10) Patent No.: US 8,161,113 B2
(45) Date of Patent: Apr. 17, 2012

(54) RICH SIGNALING FEEDBACK MECHANISM FOR GROUP COMMUNICATION

(75) Inventors: Suraj Gaurav, Issaquah, WA (US);
Arun Prasad Jayandra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/392,912

(22) Filed: Feb. 25, 2009

(65) Prior Publication Data

US 2010/0218120 A1    Aug. 26, 2010

(51) Int. Cl.
*G06F 15/16* (2006.01)

(52) U.S. Cl. ........................................ 709/205; 709/204

(58) Field of Classification Search ........... 709/203–205
See application file for complete search history.

(56) References Cited

U.S. PATENT DOCUMENTS

| | | | |
|---|---|---|---|
| 6,104,705 A | 8/2000 | Ismail | |
| 6,216,173 B1 * | 4/2001 | Jones et al. | 715/705 |
| 7,085,842 B2 * | 8/2006 | Reid et al. | 709/231 |
| 7,231,423 B1 * | 6/2007 | Horstmann et al. | 709/204 |
| 7,373,608 B2 * | 5/2008 | Lentz | 715/753 |
| 7,426,193 B2 * | 9/2008 | Roher et al. | 370/261 |
| 7,747,953 B2 * | 6/2010 | Saavedra | 715/730 |
| 7,783,704 B2 * | 8/2010 | Acharya et al. | 709/204 |
| 7,877,443 B2 * | 1/2011 | Lyle et al. | 709/204 |
| 2001/0049087 A1 | 12/2001 | Hale | |
| 2007/0271335 A1 * | 11/2007 | Bostick et al. | 709/204 |
| 2007/0294623 A1 | 12/2007 | Saavedra | |
| 2008/0016156 A1 * | 1/2008 | Miceli et al. | 709/204 |
| 2008/0034085 A1 * | 2/2008 | Chawla et al. | 709/224 |
| 2008/0091781 A1 | 4/2008 | Haruna | |
| 2008/0212499 A1 * | 9/2008 | Maes | 370/265 |
| 2008/0320082 A1 * | 12/2008 | Kuhlke et al. | 709/205 |
| 2009/0138554 A1 * | 5/2009 | Longobardi et al. | 709/204 |

OTHER PUBLICATIONS

Kim, Tammie; "Meeting Mediator: Enhancing Group Collaboration using Sociometric Feedback"; MIT Media Lab; 2008; pp. 1-10; http://web.media.mit.edu/~taemie/papers/CSCW2008_TaemieKim.pdf.
Lasso, Andras; "Communication architectures for web-based telerobotic systems"; IEEE Conference on Control and Automation, Jun. 27-29, 2001; Dubrovnik, Croatia; pp. 1-4; http://topcat.itt.bme.hu/~urbi/pubs/urbi05_med01.pdf.
Encounter Collaborative; "Meet and Collaborate Online with Live Meeting Web-Conferencing Software"; 2006; pp. 1-4; http://www.encounter.net/home/web-livemeeting.asp.
Top Speed Data Communications; "Web Conferenceing Services"; 2007; http://webconferencing4lessonline.com/web-conferencing.html.

* cited by examiner

*Primary Examiner* — Minh-Chau Nguyen
(74) *Attorney, Agent, or Firm* — Workman Nydeger

(57) ABSTRACT

Managing a web based conference. The web based conference includes one or more presenters connected through a network to one or more conference attendees. The presenters control data sent to the attendees. User input is received at a presenter computing system from a presenter indicating that a message should be sent to a number of computing systems being used by attendees. In response to receiving the user input at the presenter computing system, a message is sent to the of computing systems. One or more acknowledgment messages are received from at least a portion of the plurality of computing systems. Based on the one or more acknowledgement messages, a metric is generated for the number of recipients that received the message. The metric is displayed to the presenter.

17 Claims, 3 Drawing Sheets

RICH SIGNALING FEEDBACK MECHANISM FOR GROUP COMMUNICATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Networked computer systems have also allowed for the implementation of virtual meetings and conferences where participants participate by using their networked computer systems. For example, a virtual conference may be held where presenters control messages delivered to attendees at the conference. For example, presenters may control how slide show images, presentation slide images, video, etc are displayed to attendees attending a virtual conference.

Web conferences typically have multiple participants and often times messages need to be sent to the group as a whole. For example, for all participants in a web conference to stay synchronized, a presenter may need to send a slide flip message to the group as a whole. Presenters may not know if messages have been received by attendees and may not know what the attendees' user experience is like. For example, a presenter may present a presentation without knowledge of what attendees are experiencing. Thus, a presenter may be discussing a slide for which one or more attendee computer systems have not received a message indicating the slide should be displayed. Thus, the attendees may experience confusion insofar as the presentation is concerned.

Further, web conferences are often limited in the number of participants that can participate. For example, typically a presenter and attendees will be hosted by the same server. The server may have a limited number of clients which thus limits the number of participants in the web conference.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One very specific embodiment illustrated herein includes a method that may be practiced in a network computing environment. The a method includes acts for managing a web based conference. The web based conference includes one or more presenters connected through a network to one or more conference attendees. The presenters control data sent to the attendees. The method includes connecting a presenter computer system to a presenter server. An attendee computer system is connected to an attendee server separate from the presenter server. The attendee server is selected so as to minimize the number of attendee servers used by maximizing the usage of resources on any given attendee server before adding additional attendee servers to service additional attendee computer systems. The method includes sending a slide flip message from the presenter computer system through the presenter server and the attendee server to the attendee computer system without sending the slide flip message through other presenter or attendee servers. An acknowledgment is sent from the attendee computer system to the presenter computer system through the attendee server and the presenter server without sending through other attendee servers and presenter servers between. The acknowledgement message is used in combination with acknowledgement messages received from other attendee computing systems to create and display a metric to a presenter at the presenter computing system illustrating a quantity of slide flip messages received by attendee computer systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to implementing an interactive web based conference, including functionality for providing presenters at the conference with metrics about attendees' user experiences and/or simulated or actual attendee user experience. In particular, embodiments allow presenters to send messages to attendees. One such message may be messages such as slide flip messages that indicate that a new slide (such as a PowerPoint® slide) should be displayed. User machines can then provide feedback which can be used to generate a metric about the message, such as a metric defining the number of attendees that received the slide flip message.

Embodiments may also include functionality for implementing an infrastructure that facilitates efficient and scalable web based conferences. For example, in some embodiments, multiple servers are used, where each of the servers is able to support a limited number of attendees. Before using additional servers, attempts are made to fully utilize available servers. This helps to eliminate the number of messages that are sent between servers, which helps to make the communication process more reliable. However, by adding additional servers to the infrastructure, additional attendees can be supported at a web-based conference.

Some embodiments include an Internet scale service for conducting events in real time over the web. The events may be targeted towards a workload that is characterized by a small set of presenters (typically less than 10), that want to share real-time content, including slide shows, such as PowerPoint(®) presentations, Audio/Video, Application sharing, etc. with a large set of attendees. Furthermore, the service provides rich capabilities for attendee and presenter interaction, including the ability to conduct polls, provide attendee visibility, question answer sessions, chat, whiteboard etc.

Figure 1:
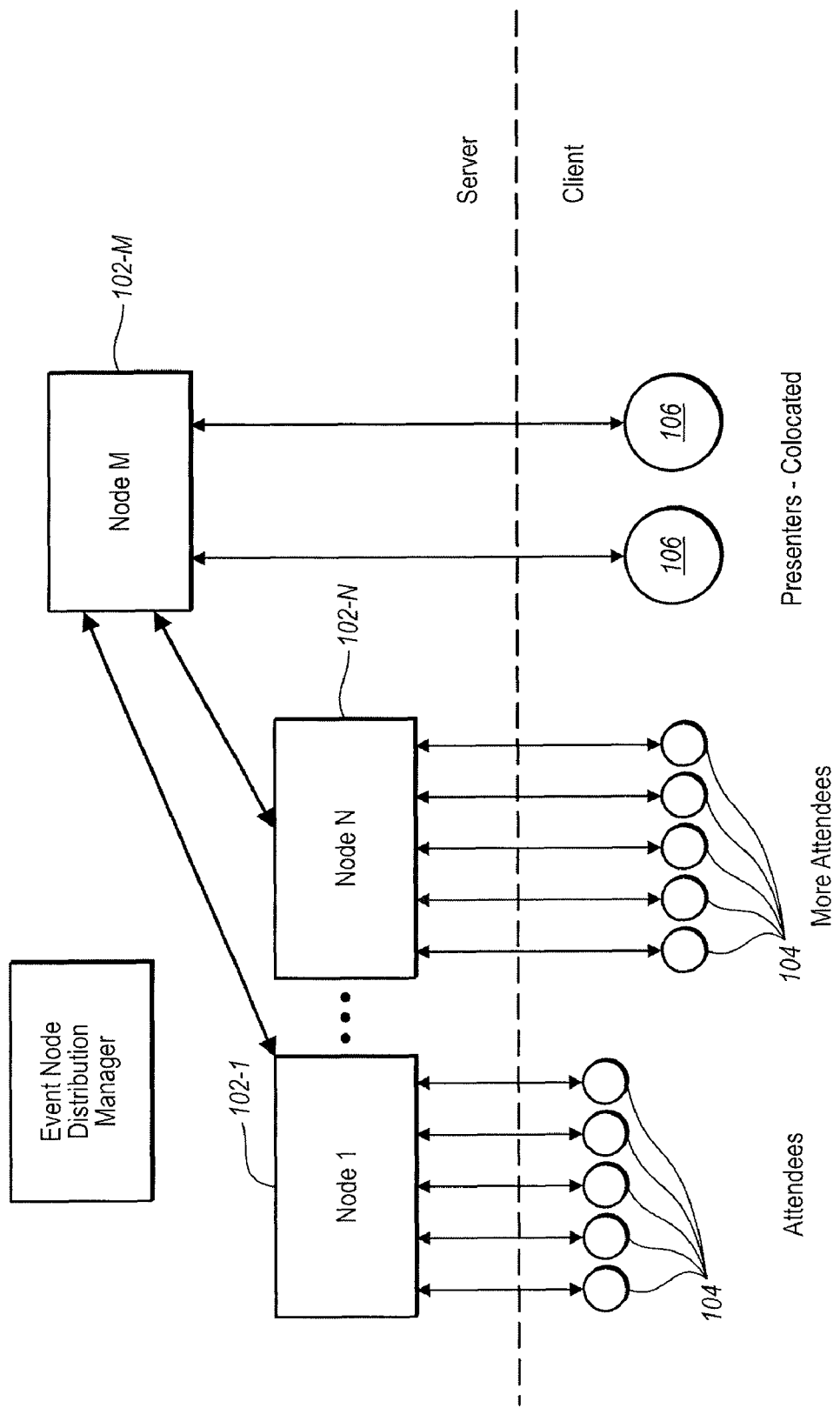
FIG. 1 illustrates a server-client topology for web conferences.

Referring now to FIG. 1, an infrastructure mechanism to make group communication more reliable in web conferences is illustrated. All the participants, e.g. attendees and presenters, of the conference connect to a bank of central server nodes illustrated generally at 102 and specifically at 102-1 through 102-N and 102-M. Each server can act as the connection endpoint for thousands of attendee clients, illustrated generally at 104. The clients 104 have logic to receive messages and send acknowledgements back to the sender.

FIG. 1 further illustrates presenter clients, illustrated generally at 106, connected to a server node 102-M. Because there are typically relatively few presenters, in some embodiments, such as the embodiment illustrated at FIG. 1, all of the presenters may be collocated or connected to the same server node 102-M. Notably, the server node 102-M, while not shown in FIG. 1, may include functionality for servicing attendee clients 104 in addition to the presenter clients 106. In particular, the server node 102-M may be capable of servicing many clients, and due to the small number of presenters, additional server resources can be devoted to servicing attendee clients 104. Additionally, presenters may be on different servers, however, as will be explained in more detail below, this may cause a slight increase in the amount of network traffic that is experienced.

Attendees, on the other hand, often cannot fit on a single server due to sheer numbers. As such, they may be distributed to a set of servers. For example, when all server nodes 102 will support a maximum of 2,000 connections, an event with 100,000 attendees can be split across 50 server nodes 102, each hosting 2,000 connections in addition to the one server node 102-M for presenters. Thus, the communication from one presenter to 100,000 attendees is reduced to communication from a presenter client 106 to a presenter node 102-M to and 50 other nodes 102-1 through 102-N where N=50 in this example. Attendee servers 102-1 through 102-N need not connect to one another, but rather only connect to presenter server 102-M (or other presenter servers if more than one is used). This reduces the number of connections greatly, making it linear in number of attendee nodes. In contrast, when all conference participants are connected to each other, such as in general any-any communication, the number of connections needed grows exponentially in number according to the quadratic $O(n^2)$, where n=number of participants in a conference.

In the example illustrated, the presenter server node 102-M sends a message to each of the attendee server nodes 102-1 through 102-N, which in turn send the message down to each attendee client 104 through a reliable transport channel like TCP or HTTP. Attendee clients 104 in turn acknowledge the receipt of the message by pass an acknowledgement to their server 102, which passes it on to presenter server 102-M. In the example illustrated, there are a maximum of two intermediaries (an attendee server 102 and presenter server 102-M) between any given attendee client 104 and presenter client 106. For attendees collocated with the presenters 106 on the presenter server 102-M, there is only a single intermediary (namely server 102-M). This reduces the complexity of the system and makes communication more reliable and simplifies error handling.

Note that embodiments may be implemented on commodity hardware where nodes can fail independently. Embodiments that include a smaller number of server-server connections and small set of servers allow feedback to sent to presenter more quickly. Thus, some embodiments may be implemented to limit the number of servers 102 used. In particular, before adding additional servers 102 to an infrastructure, embodiments may implement a check to determine that all existing servers are fully utilized or are at some predetermined high percentage of utilization.

Figure 2:
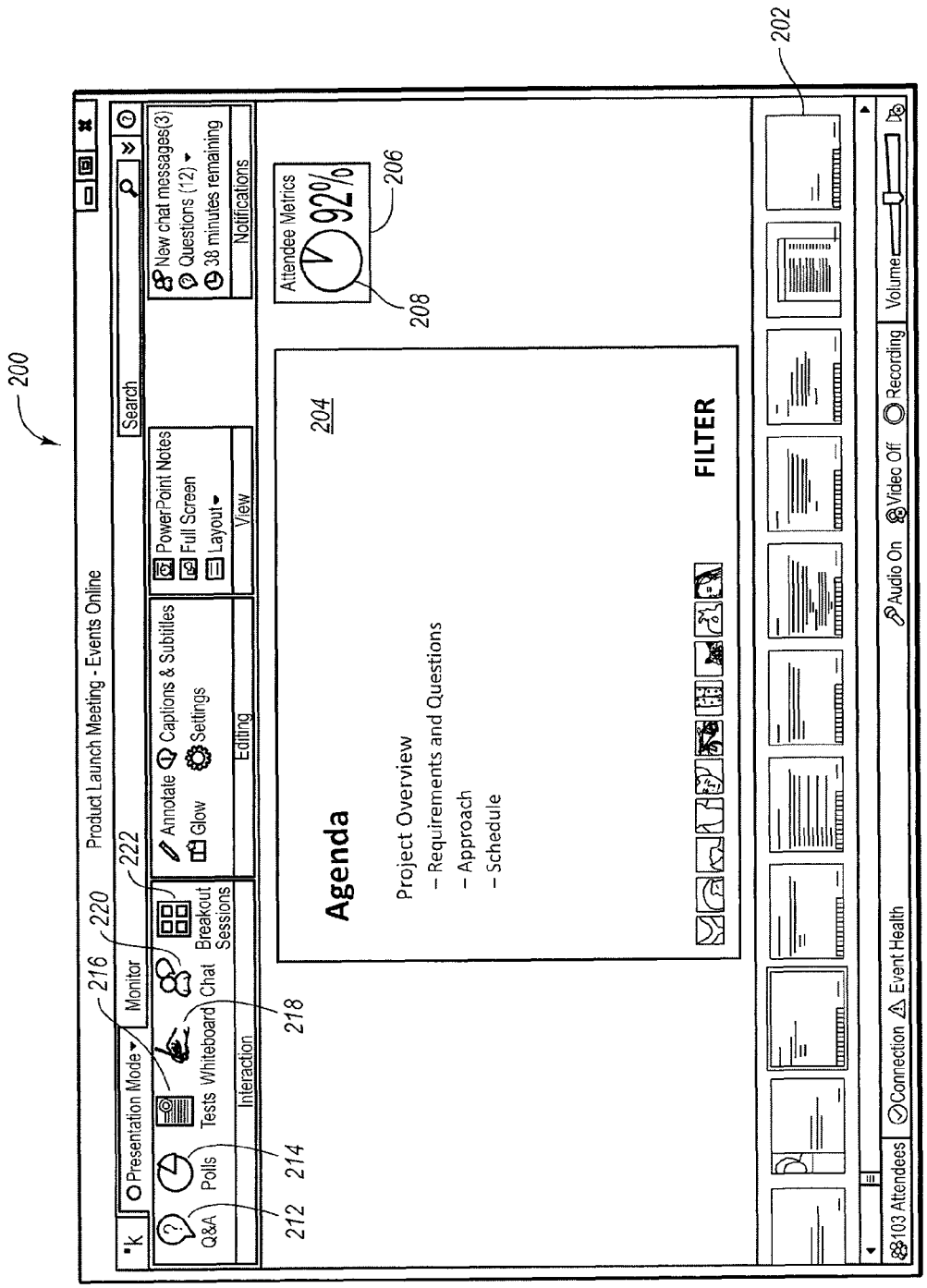
FIG. 2 illustrates a presenter user interface for a web conference.

As noted, embodiments may also include a user interface that allows a presenter to obtain information about an attendee user experience. In particular, a user interface 200 is illustrated in FIG. 2. The user interface 200 includes several features to allow a presenter to control a presentation. For example, the user interface 200 includes a slide selection interface 202 that allows a presenter to select a slide for presentation to attendees attending the web-conference. By selecting a slide from the slide selection interface, software implementing the user interface 200 can cause one or more slide flip messages to be transmitted to attendees attending the web-conference. FIG. 2 further illustrates a selected slide display 204. The selected slide display 204 displays the slide selected from the slide selection interface 202.

In some embodiments, a presenter can set a user setting so that the selected slide display 204 displays slides in a fashion that approximately simulates what a typical attendee may be experiencing. In particular, when a slide flip message is sent to attendee machines, the attendee machines (i.e. clients 104) respond with an indication that the message was received. In one embodiment, when a given number of messages have been received indicating that a slide flip message was received, the slide display 204 displays the slide selected in the slide selection interface 202. For example, the user interface 200 may have a setting set indicating that when 90% of users have received a slide flip message, then a selected slide corresponding to the slide flip message should be displayed at the slide display 204. Thus, when a number of messages from clients 104 indicating that a slide flip message has been received, then the slide display 204 will display the corresponding slide. In alternative embodiments, the slide display 204 may display a slide selected from the slide selection interface 202 as soon as practicable with attendee experience displays being displayed in separate tabs or windows of the user interface 200.

The user interface may also include a metric indicator 206 that can be displayed indicating the number of attendees that have received a particular message. For example, the user interface 200 may keep track of the number of messages received from attendee clients 104 indicating that a particular message has been received. The user interface 200 can then display a metric in the metric indicator 206 indicating a quantity of how many of these messages have been received. This can be displayed in a number of different fashions. For example, the metric indicator 206 may display a graph 208, such as a pie graph illustrating representations of a quantity of attendees that have received the message as compared to those who have not. For example, the graph 208 may display a red portion indicating attendees that have not received the message and a green portion that indicates the number of attendees that have received the message. In addition or alternatively, the attendee metric indicator may include a numerical indication 210 of attendees that have received a message. In the example illustrated in FIG. 2, the numerical indication 210 is a percentage. However, in other embodiments, the numerical indication may be a number indicating the raw number of attendees that have received the message or some other indicator.

Based on the metrics displayed in the attendee metric display 206, a presenter can determine and implement corrective actions. For example, if a presenter determines that a low number of attendees have received a message, the presenter may resend the message, such as by reselecting a slide from the slide selection interface 202.

While the preceding example is illustrated in the context of a slide flip message, it should be appreciated that other additional or alternative messages may be sent. For example, FIG. 2 illustrates a number of additional and/or alternative buttons that a presenter may select in the user interface 200. In particular, the user interface 200 includes a question and answer button 212, a polls button 214, a tests button 216, a whiteboard button 218, a chat button 220, and a breakout sessions button 222. Other buttons, while not shown here may alternatively or additionally be used. The presenter selecting the question and answer button 212 allows the presenter to send messages to attendee clients 104 to initiate, activate, and/or communicate with software on the attendee clients 104 to facilitate question and answer interaction (e.g. sending and receiving questions and answers between attendees and presenters). The presenter selecting the polls button 214 allows the presenter to send messages to attendee clients 104 to initiate, activate, and/or communicate with software on the attendee clients 104 to facilitate poll interaction (e.g. sending and receiving poll questions and answers between attendees and presenters). The presenter selecting the tests button 216 allows the presenter to send messages to attendee clients 104 to initiate, activate, and/or communicate with software on the attendee clients 104 to facilitate test interaction (e.g. sending and receiving test questions and answers between attendees and presenters). The presenter selecting the whiteboard button 218 allows the presenter to send messages to attendee clients 104 to initiate, activate, and/or communicate with software on the attendee clients 104 to facilitate whiteboard interaction (e.g. sending and receiving annotations to a digital whiteboard between attendees and presenters). The presenter selecting the chat button 220 allows the presenter to send messages to attendee clients 104 to initiate, activate, and/or communicate with software on the attendee clients 104 to facilitate chat interaction (e.g. sending and receiving text messages between attendees and presenters). The presenter selecting the breakout sessions button 212 allows the presenter to send messages to attendee clients 104 to initiate, activate, and/or communicate with software on the attendee clients 104 to facilitate breakout interaction (e.g. dividing attendees into separate groups that can communicate with the presenter and members of their own group through text, voice, video, etc.).

While a number of different types of messages have been illustrated, some embodiments may prioritize some messages over other messages. For example, slide flip messages may be prioritized over other messages. In some embodiments, this allows for the greatest benefit to the most users.

Some embodiments may include functionality for addressing message failures. For example, some embodiments include functionality whereby messages are retried in the wake of server and client side failures. Eventually, a presenter receives positive acknowledgements from a set of attendees. This serves as the feedback to the presenter and can be used to determine the next course of action.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
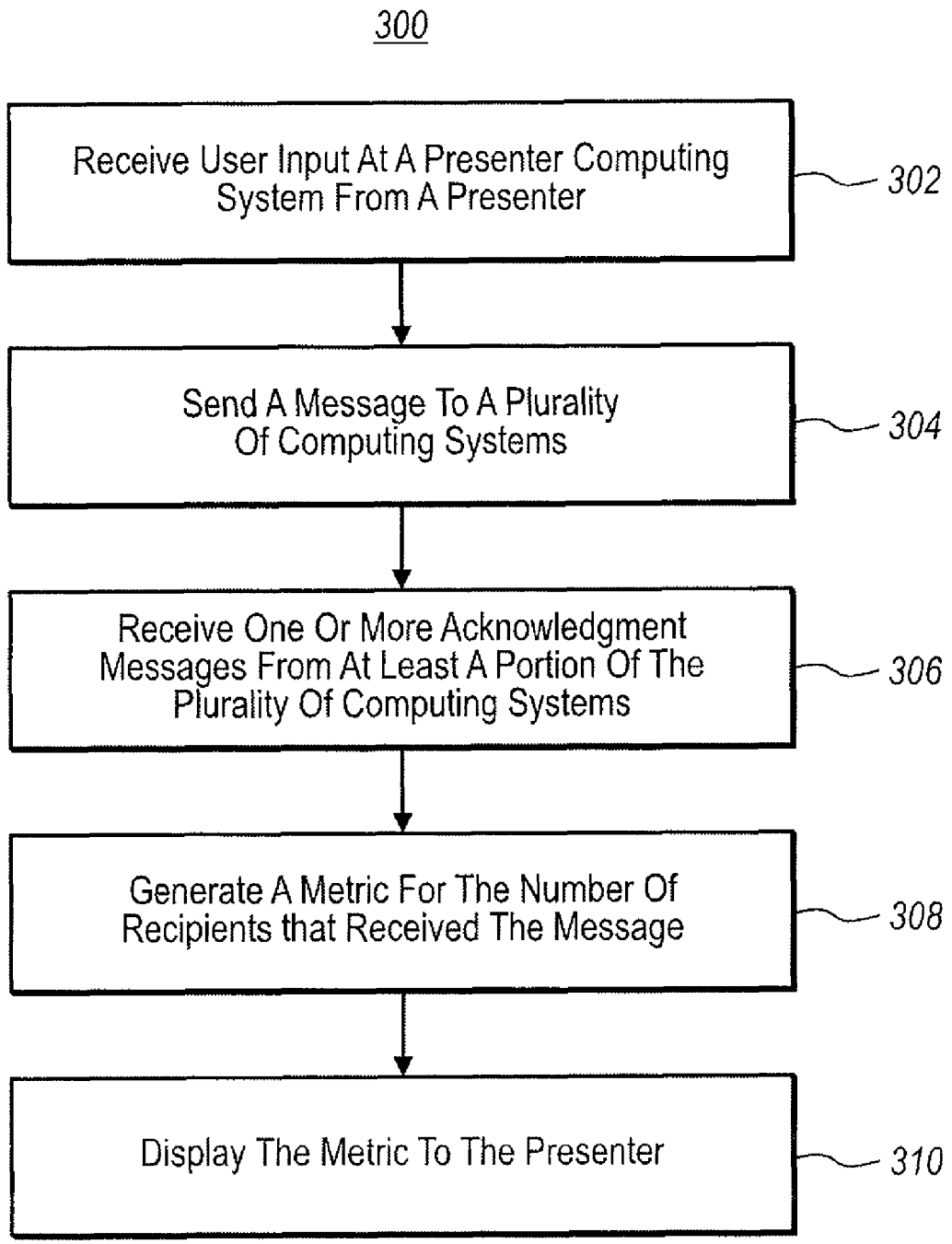
FIG. 3 illustrates a method of providing information to a presenter at a web conference.

Referring now to FIG. 3, a method 300 is illustrated. The method 300 may be practiced, for example, in a networked computing environment. The method includes acts for managing a web based conference. The web based conference includes one or more presenters connected through a network to one or more conference attendees. The presenters control data sent to the attendees.

The method 300 includes receiving user input at a presenter computing system from a presenter (act 302). The user input indicates that a message should be sent to a plurality of computing systems being used by attendees. As illustrated previously herein, such interaction and messages may include one or more of slide flip messages, question and answer messages, test messages, whiteboard messages, chat messages, breakout session messages, or other messages.

In response to receiving the user input at the presenter computing system, the method 300 further includes sending a message to the plurality of computing systems (act 304). For example, messages may be sent to the attendee clients 104.

The method 300 may further include receiving one or more acknowledgment messages from at least a portion of the plurality of computing systems (act 306). Illustratively, the attendee clients 104 may send an acknowledgement messages that a slide flip message or other message was received from the presenter.

Based on the acknowledgement messages, the method 300 further includes generating a metric for the number of recipients that received the message (act 308). As illustrated, such a metric may be a percent of attendees that have received a message, a raw number of attendees that have received a message, and/or a graphic illustrating what attendees have received a message.

The method 300 further includes displaying the metric to the presenter (act 310).

The method 300 may be performed where sending a message to the plurality of computing systems (act 304) includes sending the message to one or more attendee servers. Thereafter, the message is sent to individual attendees through a reliable transport channel. For example, the presenter clients 106 may send a message to the presenter server 102-M, where the message is sent to one or more attendee servers 102-1 through 102-N. The message is then sent to individual attendee clients 104 through TCP or HTTP.

The method 300 may be performed where displaying a metric (act 310) includes displaying a percentage of attendees that received the message. In some embodiments, displaying a metric may include displaying an average or mean latency for the message to reach attendees. For example, while not illustrated in FIG. 2, the metric indicator may include information indicating the average length of time or mean length of time for a message to reach attendees. This may be computed based on the amount of time it takes to receive acknowledgement messages back from attendee clients 104.

The method 300 may be performed where receiving one or more acknowledgment messages from at least a portion of the plurality of computing systems (act 306) includes receiving an acknowledgement message from an attendee computing system with another message from the attendee computing system. For example, receiving an acknowledgement message from an attendee computing system with another message from the attendee computing system may include receiving the acknowledgement message with an unrelated message, such as a question from an attendee or some other message. In some embodiments, receiving an acknowledgement message from an attendee computing system with another message from the attendee computing system may include receiving the acknowledgement message in a same packet as the another message.

The method 300 may further include displaying an attendee experience view to a presenter. For example, a presenter may have displayed at a computing machine for the presenter, a view which allows the presenter to experience what a typical attendee to the web conference might be experiencing. In one example, the method 300 may be performed where displaying an attendee experience view to a presenter is performed as a result of the presenter connecting to the conference as an attendee in addition to being connected as a presenter. For example, a machine used by the presenter may be connected as both an attendee client 104 and a presenter client 106. In an alternative embodiment, the method 300 may be performed where displaying an attendee experience view to a presenter includes simulating an attendee experience in the aggregate by applying average or mean latencies to display graphical transitions. For example, a determination may be made about how long it takes for messages, such as slide flip messages, to reach one or more attendee clients. This determination can be used to simulate an attendee experience for a presenter.

Some embodiments of the method 300 may further include determining that an attendee computer system has disconnected from the web based conference prior to receiving the message, detecting that the attendee computer system has reconnected to the web based conference, and in response to detecting that the attendee computer system has reconnected to the web based conference, resending the message to the attendee computer system. This allows, in some embodiments for messages to be sent to attendee clients even when attendee clients have disconnected for short periods of time from a web conference.

Some embodiments of the method 300 may further include displaying an attendee interaction portion of a user interface to the presenter. The attendee interaction portion may display messages received from attendees and the attendee interaction portion may include functionality for receiving user input from a presenter to respond to attendee messages or to sua sponte send messages to one or more attendees. For example, the method 300 may include receiving user input at the user interface indicating that an interactive message should be broadcast to a plurality of the attendees, and in response, broadcasting the interactive message to computer systems for the plurality of the attendees. Alternatively, the method 300 may further include receiving user input at the user interface indicating that an interactive message should be unicast to a single attendee, and in response, unicasting the interactive message to a computer system for the single attendee.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment, a method of managing a web based conference, the web based conference including one or more presenter computing systems connected through a network to a plurality of attendee computing systems, wherein the presenter computing systems control data sent to the attendee computing systems, the method comprising:
    receiving user input at a presenter computing system from a presenter, during a web based conference, indicating that a slide flip message should be sent to a plurality of attendee computing systems, the message instructing each of the plurality of attendee computing systems to flip a slide in a presentation being used in the web based conference;
    in response to receiving the user input at the presenter computing system, sending the slide flip message to each of the plurality of attendee computing systems, wherein the slide flip message is sent via a first attendee server that connects the presenter computing system to each of the plurality of attendee computing systems;
    receiving an acknowledgment from each of at least a portion of the plurality of attendee computing systems indicating that each of the at least a portion of the plurality of attendee computing systems has flipped the slide in the presentation;
    based on the number of acknowledgements received, generating a metric that represents the number of attendee computing systems that flipped the slide in the presentation;
    displaying the metric to the presenter on the presenter computing system;
    after at least one additional attendee computing system has been joined the web based conference in response to the number of attendee computing systems participating in the web based conference exceeding a specified threshold, receiving second user input at the presenter computing system from the presenter, during the web based conference, indicating that another slide flip message should be sent to the plurality of attendee computing systems as well as the at least one additional attendee computing systems; and
    in response to receiving the second user input at the presenter computing system, sending the slide flip message to the plurality of attendee computing systems via the first attendee server, and to the at least one additional attendee computing system via a second attendee server that was added to route messages of the web based conference from the presenter computing system to each of the at least one additional attendee computing system.

2. The method of claim 1, further comprising displaying an attendee experience view to a presenter.

3. The method of claim 2, wherein displaying an attendee experience view to a presenter is performed as a result of the presenter connecting to the conference as an attendee in addition to being connected as a presenter.

4. The method of claim 2, wherein displaying an attendee experience view to a presenter comprises simulating an attendee experience in the aggregate by applying average or mean latencies to display graphical transitions.

5. The method of claim 1, further comprising displaying an attendee interaction portion of a user interface to the presenter, the attendee interaction portion displaying messages received from attendee computing systems and the attendee interaction portion including functionality for receiving user input from a presenter to respond to attendee messages or to sua sponte send messages to one or more attendee computing systems.

6. The method of claim 5, further comprising receiving user input at the user interface indicating that an interactive message should be broadcast to a plurality of the attendee computing systems, and in response, broadcasting the interactive message to the attendee computing systems.

7. The method of claim 5, further comprising receiving user input at the user interface indicating that an interactive message should be unicast to a single attendee computing system, and in response, unicasting the interactive message to the single attendee computing system.

8. The method of claim 1, wherein sending the slide flip message to each of the plurality of attendee computing systems comprises sending the slide flip message to one or more attendee servers which then send the slide flip message to the plurality of attendee computing systems.

9. The method of claim 1, wherein displaying the metric comprises displaying a percentage of attendee computing systems that flipped the slide in the presentation.

10. The method of claim 1, wherein displaying the metric comprises displaying an average or mean latency for the slide flip message to reach the attendee computing systems.

11. The method of claim 1, further comprising:
    determining that an attendee computer system has disconnected from the web based conference prior to receiving the slide flip message;
    detecting that the attendee computer system has reconnected to the web based conference; and
    in response to detecting that the attendee computer system has reconnected to the web based conference, resending the slide flip message to the attendee computer system.

12. A system for monitoring participants in a web based conference comprising:
    a presenter computing system;
    a presenter server connected to the presenter computing system;
    an attendee server connected to the presenter server; and
    a plurality of attendee computing systems connected to the attendee server;
    wherein during the web based conference in which a slide show is displayed on each of the plurality of attendee computing systems, the presenter computing system sends a slide flip message to each of the attendee computing systems via the presenter server and the attendee server,
    wherein the attendee computing systems flip a slide in the slide show when a slide flip message is received, and send an acknowledgement to the presenter computing system indicating that the slide was flipped, wherein the presenter computing system receives the acknowledgements from each of the plurality of attendee computing systems, and wherein the presenter computing system displays a metric to represent the percentage of attendee computing systems that have flipped the slide based on the number of attendee computing systems from which an acknowledgement has been received; and wherein the system further comprises one or more additional attendee servers that are added to the system and which route messages from the presenter server to additional attendee computing systems when the number of attendee computing systems participating in the web based conference exceeds a specified threshold.

13. The system of claim 12, wherein the presenter computing system resends the slide flip message when it is determined that the number of attendee computing systems from which an acknowledgement has been received is below a threshold after a specified duration of time after the initial slid flip message was sent.

14. One or more computer storage media, which do not include signals, storing computer executable instructions which when executed perform the following steps:

receiving user input at a presenter computing system from a presenter, during a web based conference, indicating that a slide flip message should be sent to a plurality of attendee computing systems, the message instructing each of the plurality of attendee computing systems to flip a slide in a presentation being used in the web based conference;

in response to receiving the user input at the presenter computing system, sending the slide flip message to each of the plurality of attendee computing systems, wherein the slide flip message is sent via a first attendee server that connects the presenter computing system to each of the plurality of attendee computing systems;

receiving an acknowledgment from each of at least a portion of the plurality of attendee computing systems indicating that each of the at least a portion of the plurality of attendee computing systems has flipped the slide in the presentation;

based on the number of acknowledgements received, generating a metric that represents the number of attendee computing systems that flipped the slide in the presentation;

displaying the metric to the presenter on the presenter computing system;

after at least one additional attendee computing system has been joined the web based conference in response to the number of attendee computing systems participating in the web based conference exceeding a specified threshold, receiving second user input at the presenter computing system from the presenter, during the web based conference, indicating that another slide flip message should be sent to the plurality of attendee computing systems as well as the at least one additional attendee computing systems; and in response to receiving the second user input at the presenter computing system, sending the slide flip message to the plurality of attendee computing systems via the first attendee server, and to the at least one additional attendee computing system via a second attendee server that was added to route messages of the web based conference from the presenter computing system to each of the at least one additional attendee computing system.

15. The one or more computer storage media of claim 14, wherein sending the slide flip message to each of the plurality of attendee computing systems comprises sending the slide flip message to one or more attendee servers which then send the slide flip message to the plurality of attendee computing systems.

16. The one or more computer storage media of claim 14, wherein displaying the metric comprises displaying a percentage of attendee computing systems that flipped the slide in the presentation.

17. The one or more computer storage media of claim 14, wherein displaying the metric comprises displaying an average or mean latency for the slide flip message to reach the attendee computing systems.

* * * * *

UNITED STATES PATENT AND TRADEMARK OFFICE
CERTIFICATE OF CORRECTION

PATENT NO. : 8,161,113 B2  
APPLICATION NO. : 12/392912  
DATED : April 17, 2012  
INVENTOR(S) : Gaurav et al.

Page 1 of 1

It is certified that error appears in the above-identified patent and that said Letters Patent is hereby corrected as shown below:

On the Title page, Item [57] under "Abstract" column 2, line 9, after "the" delete "of".

In the Specification

Column 1, line 59, after "the" delete "a".

Column 4, line 16, delete "sent" and insert -- send --, therefor.

In the Claim

Column 11, line 19, Claim 13, delete "slid" and insert -- slide --, therefor.

Signed and Sealed this
Tenth Day of February, 2015

Michelle K. Lee
*Deputy Director of the United States Patent and Trademark Office*